Sept. 19, 1961 F. H. BRAY ET AL 3,001,029

AUTOMATIC TELECOMMUNICATION EXCHANGES

Filed Nov. 25, 1957

2 Sheets-Sheet 1

Inventors
F.H.Bray – R.G.Knight
By [signature]
Attorney

Sept. 19, 1961 F. H. BRAY ET AL 3,001,029

AUTOMATIC TELECOMMUNICATION EXCHANGES

Filed Nov. 25, 1957 2 Sheets-Sheet 2

Inventors
F. H. Bray - R. G. Knight
By R. P. Morris
Attorney

United States Patent Office 3,001,029

Patented Sept. 19, 1961

3,001,029
AUTOMATIC TELECOMMUNICATION EXCHANGES

Frederick Harry Bray and Ronald George Knight, London, England, assignors to International Standard Electric Corporation, New York, N.Y.

Filed Nov. 25, 1957, Ser. No. 698,493
Claims priority, application Great Britain Dec. 21, 1956
8 Claims. (Cl. 179—18)

The present invention relates to an automatic telecommunication exchange.

According to the present invention there is provided an automatic telecommunication exchange in which numbered subscribers' lines are divided into first sets each consisting of a block of sequentially numbered lines, corresponding groups of lines having the same sub-blocks of numbers within all of said first sets constituting second sets, in which a detector common to all of said lines examines the conditions of each second set of lines taken as a whole and in response to a calling condition on a line of a second set marks individually every line of that second set, in which detectors each individual to a first set of lines examine their respective sets of lines simultaneously, in which when a detector which is individual to a first set of lines responds to a calling condition it marks corresponding lines in each sub-block of its first set, in which a calling line is only detected when it has been marked both by the detector serving all of said lines and by the detector serving the first set of lines to which it belongs, and in which the two detectors serving a line must respond to a calling condition thereon in a predetermined order, the second of the detectors to respond being only able to respond to a line which is both in the calling condition and marked by the other of said detectors.

According to the present invention there is also provided an automatic telecommunication exchange in which numbered subscribers' lines are divided into first sets each consisting of a block of sequentially numbered lines, corresponding groups of lines having the same sub-blocks of numbers within all of said first sets constituting second sets, which comprises a primary detector for examining the condition of each of said second sets of lines taken as a whole and responsive to a calling condition on a line of one of said second sets to mark individually every line in the second set to which the primary detector has responded, and secondary detectors each individual to one of said first sets of lines and arranged to examine their respective sets of lines simultaneously for a line which is both in the calling condition and marked from said primary detector, a secondary detector which has responded to a line which is both in the calling condition and marked from said primary detector being arranged to mark corresponding lines in each sub-block of its own first set of lines, and whereby one of said lines which is in the calling condition is marked by said primary detector and by one of said secondary detectors, and hence its calling condition is detected.

The invention will now be described with reference to the accompanying drawings, in which FIG. 1 shows a fully electronic subscriber's line circuit, part of a terminal connector switch, such as is used in the telephone exchange described in our patent application, Serial No. 536,963, filed September 27, 1955, and connections to the line circuit from primary and secondary detectors and a called line marker.

Figure 1:
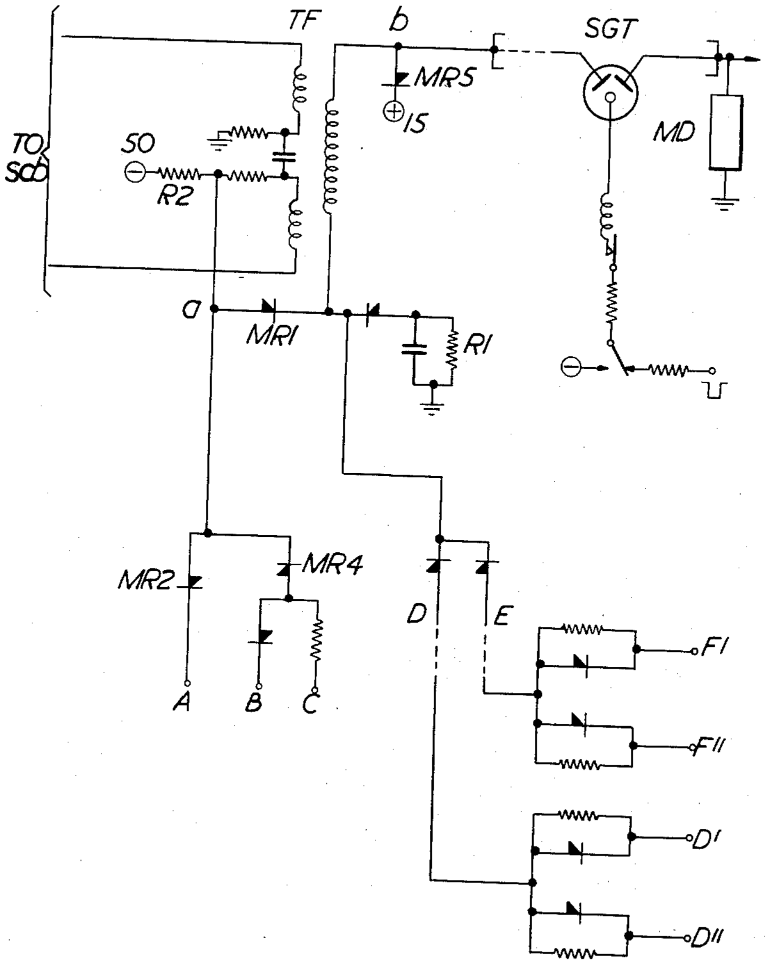

The line circuit and associated circuits which are described herein are intended for use in an automatic telephone exchange which is generally similar to the exchange described in our patent application referred to above. It will be noted from FIG. 1, however, that connections are set up over a single-wire speech path within the exchange, whereas in the exchange described in the above-mentioned patent specification connections are set up over a two-wire speech path. The subscriber's set is assumed to be of a type which will allow a direct current of about 10 milliamperes to flow in the line when the latter is looped. Ringing is conveyed by an interrupted audio frequency tone.

GENERAL DESCRIPTION

The subscribers' lines of an exchange are sub-divided into first sets each consisting of a block of consecutively numbered lines, the sets having, say 200 lines each. Each such block of lines is sub-divided into a number of sub-blocks of say 10 lines each. Corresponding sub-blocks of lines in all first sets are each regarded as a second set of lines. A number of these first sets of lines are served by a primary detector which is also called a group identity circuit, which tests the lines of all of the first sets which it serves in search of a line in a calling condition. This primary detector may serve the entire exchange if so desired. When a primary detector, or the single primary detector if there is only one for the entire exchange, detects a subscriber's line in the calling condition, it responds to this calling condition and applies a marking potential to the line circuits of all lines which belong to the second set (i.e. the sub-block of 10 lines within any first set of lines) including the calling line. For instance, if the primary detector detects a line in the calling condition in the 7th sub-block of lines in one of the sets of lines which it serves, i.e. a calling line in the 7th second set of lines, the marking is applied to all lines which belong to a 7th sub-block of lines, irrespective of which first set of lines they belong to. In the example already mentioned of a 10,000 line exchange having 50 first sets each of 200 lines, the detection of a calling line by a primary detector serving those 50 first sets causes a marking to be applied to all of the lines of a second set of 500 lines, including that on which the calling condition was detected.

In addition to the primary detector, which serves a number of first sets of lines (perhaps even the whole exchange) there are a number of secondary detectors, also known as line identity circuits, each of which serves one of the first sets of lines. Hence in the example just mentioned there are 50 such circuits. Each secondary detector tests among the lines of its own first set in search of a line which is both in the calling condition and marked from the primary detector. When a line which is both calling and marked, as just mentioned, is found, the secondary detector serving its set responds and applies a further marking to all of the lines in its own first set of lines which have the same position within their sub-blocks of lines as does the line to which it has responded. Thus if, in the example already mentioned, the calling line is the 3rd line in the 7th sub-block of lines of the 17th first set of lines, the secondary detector serving the 17th first set of lines applies the further marking to every line in the 17th first set which is the 3rd line in its sub-block. Thus the further marking is applied to 20 lines including the calling line.

Therefore, when both a primary and a secondary detector have responded to a line in a calling condition, markings will be applied to a number of lines in the exchange. One line, however, is marked simultaneously from both a primary detector and a secondary detector and the line circuit of this line responds to this coincidence of markings to cause that line to be extended via a switch for handling outgoing calls. When the primary detector responds as described above, a lock-out circuit included in it stops it from further testing. Similarly the testing by a secondary detector is stopped when it responds to a line which is both calling and marked from the primary detector. It is, however, possible that there will be lines served by different secondary detectors which are both calling and marked from the primary detector. If this is so, then more than one secondary detector will respond. Therefore, several lines in the calling condition can be detected simultaneously.

An alternative method of detecting a line in the calling condition is to use the line identity circuits, each of which serves a first set of lines, as primary detectors. In such a case the response of a primary detector marks each line within its own first set of lines which have the same position within their sub-block. Then the group identity circuit, used as a secondary detector, tests the second sets of lines, and responds to a line which is both marked from a primary detector and in the calling condition. Here again the double marking causes the extension of a calling line.

In both of the methods of operation mentioned above, all of the detectors are enabled at a fixed time in a controlling cycle and disabled at a further fixed time, so that reset after detection is automatic.

*Operation of the line circuit (FIG. 1)*

In the idle condition, i.e. when a subscriber's line is unlooped, the potential at point *a* in the line circuit is negative with respect to about −40 volts. If the subscriber initiates a call, the looping of the line which occurs when he lifts his handset causes current to flow in the line, which brings the potential at point *a* to a value of approximately −5 volts. The primary and secondary detectors (group and line identity circuits) serving the line detect this change and as a result of the detection, potentials occur simultaneously on leads F′ and F″ of the calling subscriber's line circuit.

It will be remembered that the primary detector, or group identity circuit, serves a number of first sets each of 200 of subscribers' lines. When it responds to a calling condition it energises the leads F′ for all lines which belong to the same-numbered sub-block of (ten) lines, irrespective of the first set of (200) lines to which they belong. The secondary detector or line identity circuit which serves the caller's first set of lines responds to a line which is both calling and marked by the primary detector and energises the leads F″ for all lines which have the same position within the sub-blocks of lines of the first set of lines it serves as does the line to which it has responded. This marking, as mentioned above, occurs after the first-mentioned marking. Hence the leads F′ and F″ of a calling subscriber's line circuit are simultaneously energised.

When the leads F′ and F″ (FIG. 1) are simultaneously energised, point *b* which is connected via the right-hand winding of transformer TF, a decoupling rectifier and lead E to leads F′ and F″, rises in potential from earth to +75 volts.

It is a feature of the telephone exchange system mentioned above that calls outgoing from and incoming to the exchange are set up via terminal connector multi-switches. Each of these switches has a number of outlets to first links and a number of outlets to final links. Outgoing calls are set up via first links and incoming calls via final links. The operations involved will be explained herein as far as is necessary for an understanding of the present invention. At each cross-point between an inlet to and an outlet from a terminal connector there is a double anode-single cathode tube such as SGT, FIG. 1. Tubes of this type are described in the patent to Beck, No. 2,775,722. When discharges exist between the cathode and both anodes of such a tube, when it is used in a circuit, such as is shown in FIG. 1, a bi-directional speech path exists between the anodes thereof.

It will be noted from FIG. 1 that in the exchange in which the present circuits are used, the connections within the exchange are set up over a single wire, so that only one tube per cross-point is used. The point *b* is connected to the left-hand anodes of a number of tubes, such as SGT, equal to the number of first links and final links to which the terminal connector including SGT has access. The right-hand anodes of all of the tubes connected to the same subscriber's line are connected to different first links or final links, as the case may be.

To return to the operational description, the cathodes of the tubes, such as SGT, for all first links accessible via the terminal connector which includes SGT are pulsed sequentially by negative pulses. When a negative pulse is applied to the cathode of a tube, such as SGT, whose left-hand anode is at +75 volts, the left-hand anode-to-cathode gap of that tube fires. This automatically fires the right-hand anode-to-cathode gap of the same tube. Current flowing in the cathode circuit of the tube marks the first link to which it gives access as busy.

The anode current of the left-hand gap of the fired tube SGT flows through resistor R1, and the voltage drop thereacross marks the calling subscriber's line as busy so that his line circuit cannot now be seized by a terminating call. At a time in the operating cycle subsequent to the testing of first links, the marking condition applied to leads F′ and F″ is removed. As will be seen, this is time-pulse controlled. Therefore, the calling subscriber's line circuit has been extended via a terminal connector to a first link. Subsequent seizure of a free register from the seized first link, and the consequent supply of ringing tone to the calling subscriber's line now occurs substantially as in the exchange described in the application, Serial No. 536,963, referred to above.

The calling subscriber dials in the usual manner, each impulse of a dialled digit breaking the loop. This, via point *a*, rectifier MR1 and the right-hand winding of TF causes the anode current of the left-hand gap of SGT to fall from about 10 ma. to about 1 ma. because the potential at point *a* goes negative. It is a feature of tubes of the type shown, when used in circuits such as that shown in FIG. 1, that their cathode current remains substantially constant while the tube conducts, and therefore, the current in the right-hand gap of SGT rises from about 10 ma. to about 19 ma. This change is detected by a circuit MD known as a modulation detector, which can be any suitable device, such as an electromagnetic relay, a hard valve, a transistor, etc.

It is now desirable to describe the operations involved in the line circuit for a terminating call. When a subscriber is to be called, a circuit known as a called line marker applies a marking to the called subscriber's line as soon as the wanted number has been received in the seized register and transferred therefrom to the called line marker. This marking causes, if the wanted line is free, a final link to be seized, whereafter the call is completed by interconnecting the seized first link and the seized final link. The arrangements whereby these operations occur, and whereby collision of calls and conflict between co-existing calls is avoided, are fully described in the above-mentioned application, Serial No. 536,963.

The marking just mentioned from the called line marker includes a marking to the leads D′ of all lines passing the same tens/units digit combination as the wanted line, and a marking to the leads D″ of all lines having the same hundreds/thousands digit combination as the wanted line. Assuming that the line circuit of FIG. 1 is idle and is that for the wanted line, it will be clear that markings occur simultaneously on leads D′ and D″ in FIG. 1. This coincidence raises the potential of point *b* to +75 volts, and then the cathodes of the tubes such as SGT giving access to final links are pulsed sequentially, but at different times from the cathodes of tubes giving access to first links. The controlling arrangements, which are not described here but are described in the application Serial No. 536,963, above referred to, ensure that for a calling line only a first link can be seized while for a wanted line only a final link can be seized.

Therefore, when the line circuit of FIG. 1 is "wanted," the coincidence of +75 volts on the right-hand anode of a tube, such as SGT, and the presence on that tube's cathode of a negative pulse, indicating that it gives access to a free final link, fires that tube to seize that final link. This occurs in exactly the same manner as did the seizure of first link, i.e. the cathodes of tubes which give access to free final links are pulsed successively, each being pulsed in its own time position. Busying of link and line also occurs.

The audio ringing signal would generally be supplied from the first link used for the connection, although if considered preferable it could be supplied from the final link. Detection of the wanted subscriber's reply would use an arrangement in the final link similar to that used in the first link for detecting dialling, and would cause cessation of ringing signals. The connection between calling and wanted subscribers is then effective.

If a wanted line is busy, the voltage drop across R1 sets *b* to such a potential that the markings from the called line marker are ineffective. Busy tone is applied at a fixed time if no response has occurred to the markings.

The arrangement of the line circuit and the parameters of its circuit components are such that during the time that a line circuit is connected to a first or a final link, the potential of point *a* is at least as negative as −20 volts. This is due to the anode current of the switching tube, such as SGT, which current flows in the circuit including resistor R2 via MR1. The detector circuits to be described later are so arranged that they can distinguish between this potential and the potential of −5 volts due to a calling condition. Thus multiple seizure, or the false response to a called line condition is avoided.

Release of a call is under control of the first link used for the connection, which detects a line clear condition. To prevent "follow-on" calls (from P.A.B.X.'s etc.) the presence or absence of line current provides a suitable signal of whether exchange cleardown has occurred, and can be detected at the subscriber's apparatus, e.g. by means of an electromagnetic relay connected in the line.

*Operation of the detector circuits (FIGS. 2 and 3)*

Figure 2:
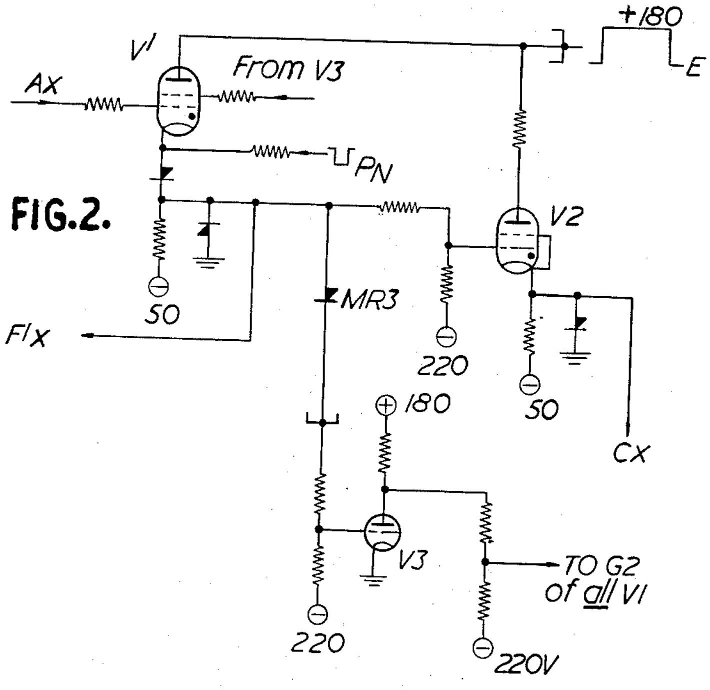
FIG. 2 shows a primary detector, also known as a group identity circuit, for use in conjunction with line circuits, such as that of FIG. 1.

The lead A (FIG. 1) of line circuits of all lines of the same second set are multipled, so that with the arrangement mentioned above there are twenty multipled leads from the leads A. The rectifiers, such as MR2, in the A leads (FIG. 1) are decoupling rectifiers. These twenty leads are multipled to the primary detector (FIG. 2). Here each of these leads is connected to the first grid of a thyratron such as V1, of which there are 20, one per multipled lead, such as A*x* (FIG. 2). During a portion of the controlling pulse time cycle before the testing of the first links, negative pulses PN are applied sequentially to the cathodes of the 20 thyratrons, such as V1.

If the grid input over the lead, such as A*x*, is at a potential which is −20 volts (or negative thereto), that thyratron will not be fired by the pulse applied to its cathode. However, if a line which is connected via its lead A to the grid of a thyratron, such as V1, is in the calling condition when the thyratron cathode is pulsed, the combination of the −5 volts due to the calling condition and the cathode pulse fires the thyratron. When one of the tubes, such as V1, fires, its cathode goes positive, and this via the decoupling rectifier, such as MR3, causes a tube V3 common to all of the thyratrons, to conduct. The current in the anode circuit of the tube V3 causes a fall in voltage at the top of the bleeder to which the anode of V3 is connected. This tap is connected to the second grids of all of the thyratrons, and prevents any other thyratron from firing. The one which has fired is unaffected, since the grids of a thyratron are unable to influence it after it has fired.

The cathode output from tube V1, which rises to about +160 volts when V1 conducts, is applied via lead F′*x* to the F′ leads (FIG. 1) for all lines which are included in the second set of lines to which the fired thyratron has responded, irrespective of the first sets of lines to which they belong. At this time, the lead F″ is still maintained at earth potential, and so no change in the potential of point *b* can occur.

The group testing pulses, i.e. the pulses which are applied to the cathodes of the "group" tubes, such as V1, may be in constant order at each cycle, or they may be continued in one cycle from the point at which the stoppage occurred on the previous cycle, or they may even be in random order. The arrangement will in general be determined as is most convenient for the circumstances of the particular exchange.

The cathode output from the tube V1 which has been fired is also applied to the control grid of a thyratron V2, individual to V1, bringing its grid up from −50 volts to earth. The tube V2, associated with the tube V1 which has fired, is therefore fired, so that its output lead C*x* is energised. As a result of this, positive potential is applied to the leads C for all lines which are within the same second set of lines as that to which a tube V1 has responded. Thus the calling line receives positive potential on leads F′ and C as a result of the operation of the primary detector.

Figure 3:
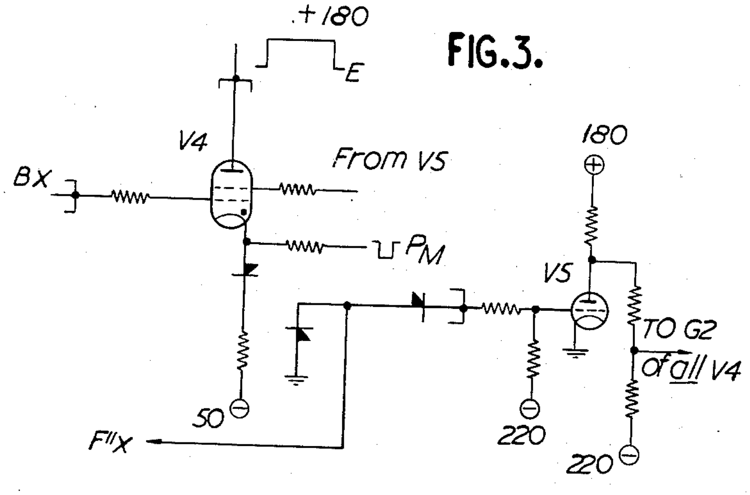
FIG. 3 shows a secondary detector, also known as a line identity circuit, for use in conjunction with the circuits of FIGS. 1 and 2.

The next stage in the operations is concerned with the secondary detector, FIG. 3, of which there is one provided per first set of lines. This circuit has a set of tubes each of which corresponds to a particular line within any sub-block of lines of the same first set.

When the above-mentioned application of potential to the terminals C for a calling line occurs, this potential is effective on the secondary detector for that line's set via lead B. This is because the calling condition at point *a* biasses rectifier MR4 positively, whereas this rectifier is not biassed positively in non-calling line circuits. Thus the terminals B of a line circuit can only receive the positive-going potential from C if the line circuit is in the calling condition and has had a marking applied to it over lead C.

The leads B for the corresponding lines in a sub-block within the same first set, are multiplied together, so that, for instance, the 20 lines which are the 5th lines within their sub-blocks of lines have their B leads multipled together. Therefore, in the present arrangement there are 10 such multipled leads per set of 200 lines. The secondary detector includes ten thyratrons, such as V4, each having its grid connected to one of the multipled B leads. These tubes are cathode pulsed sequentially in the same way as the tubes V1 of the primary detector (group identity circuit), and a tube whose grid is marked at the time at which it is pulsed at its cathode fires. The commoned outputs of tubes such as V4 fire the tube V5 which functions in the same way as did V2 to prevent any more thyratrons from firing in the same one of the secondary detectors.

The cathode output from the thyratron, such as V4, which has fired is applied via the lead F″*x* to the leads F″ for the line circuits in the first set served by that secondary detector whose number within their sub-blocks corresponds to the fired tube. Therefore one calling line has both its leads F′ and F″ marked at the same time, and this causes the subscriber's line to be extended via the terminal connector as already described.

The anode supply for all of the tubes of the primary and secondary detectors comes, as shown in FIGS. 2 and 3 from a pulse source. The pulse from this source has a duration such as to embrace of the testing pulses $P_N$ and $P_M$, and hence there is time for the calling line circuit to respond to the coincidence of the energisation on F′ and F″. Hence this anode supply pulse ends after the extension of a connection via the terminal connector, and when it ends it causes the release of the primary and secondary detectors.

It will be noted that the lock-out thyratron V5 only stops the testing by its own secondary detector. Therefore if there were several calling lines in the second set to which the primary detector has responded, these calling lines being in different first sets of lines, several secondary detectors could respond during the same testing cycle.

In the example described there is one primary detector consisting of 41 tubes (20 such as V1, 20 such as V2, and the single tube V3) serving the 10,000 lines which are arranged in 50 first sets each of which includes 20 sub-blocks each of 10 lines. There are also 50 secondary detectors each consisting of 11 tubes (10 such as V4 and the single tube V5).

While the principles of the invention have been described above in connection with specific embodiments, and particular modifications thereof, it is to be clearly understood that this description is made only by way of example and not as a limitation on the scope of the invention.

What we claim is:

1. An automatic telecommunication exchange comprising numbered subscribers' lines divided into first sets each consisting of a block of sequentially numbered lines corresponding groups of lines having the same sub-blocks of numbers within all of said first sets constituting second sets, a first detector common to all of said lines, means in said detector for examining the conditions of each second set of lines taken as a whole, means in said detector responsive to a calling condition on a line of a second set for marking individually every line of that second set, a plurality of second detectors each individual to a first set of lines, means in said second detectors for examining their respective sets of lines simultaneously, means in each second detector responsive to a calling condition on a line in its associated first set for marking corresponding lines in each sub-block of its associated first set, and means in one of the two detectors which thus mark a calling line for rendering the marking means operative only if said calling line has been marked by the other of said detectors.

2. An automatic telecommunication exchange, as claimed in claim 1, and in which the second detectors which are individual to said first sets of lines act as primary detectors and the first detector serving all of said lines acts as a secondary detector, and contains the means which renders the marking means operative only when a line is both in the calling condition and marked by its primary detector.

3. An automatic telecommunication exchange, as claimed in claim 1, and in which the detector which serves all of said lines acts as a primary detector and the detectors which are individual to said first sets of lines act as secondary detectors and contain means which renders the marking means operative only when a line is both in the calling condition and marked by said primary detector.

4. An automatic telecommunication exchange comprising a plurality of numbered subscribers' lines divided into first sets, each set consisting of a block of sequentially numbered lines, corresponding groups of lines having the same sub-blocks of numbers within all of said first sets constituting second sets, a primary detector for examining the condition of each of said second sets of lines taken as a whole, means in said primary detector responsive to a calling condition on a line of one of said second sets for marking individually every line in the second set to which the primary detector has responded, secondary detectors each individual to one of said first sets of lines, means in said secondary detectors for examining their respective sets of lines simultaneously for a line which is both in the calling condition and marked from said primary detector, means in each secondary detector for responding to a line which is both in the calling condition and marked from said primary detector and for thereupon marking corresponding lines in each sub-block of its own first set of lines, whereby one of said lines which is in the calling condition is marked by said primary detector and by one of said secondary detectors, and means for detecting a line so marked.

5. An automatic telecommunication exchange, as claimed in claim 4, and in which said primary detector comprises a chain of gating devices each of which is individual to one of said second sets of lines, multipled connections from all of the lines of each second set to the respective gating devices, whereby a calling condition on a line causes a potential to be applied to the gating device for that line's second set, pulse supply connections to said gating devices, means for priming said gating devices over said connections singly and successively by pulses, each gating device being arranged for delivering an output only when it is both primed by one of said pulses and a potential is applied to it over the respective one of said multipled connections, means responsive to one of said gating devices delivering an output for applying marking potentials to all of the lines of that gating device's second set, and means responsive to an output from one of said gating devices to disable all other of said gating devices.

6. An automatic telecommunication exchange, as claimed in claim 5, and in which the line circuit of each said subscriber's line includes a coincidence gate having two inputs and arranged to give an output only when both inputs are energized, means for energizing one of the inputs as a result of a calling condition on its line and means for energizing its other input by a marking from said primary detector.

7. An automatic telecommunication exchange, as claimed in claim 6, and in which each said secondary detector comprises a chain of further gating devices equal in number to the number of lines in one of said sub-blocks of lines, multipled connections from the coincidence gates of corresponding lines in a first set of lines to the respective ones of said further gating devices, pulse supply connections to said further gating devices, means for delivering pulses to said connections for primary said further gating devices singly and successively, all of which pulses occur subsequent to the pulses which prime the gating devices of said primary detector, a further gating device arranged for delivering an outuput only when it is both primed by one of said pulses and a potential is applied to it from the coincidence gate of one of said lines, means responsive to one of said further gating devices delivering an output to apply marking potentials to all of the lines associated with that further gating device, and means responsive to an output from one of said further gating devices to disable all other of the further gating devices of the same secondary detector.

8. An automatic telecommunication exchange, as claimed in claim 7, in which each subscriber's line circuit includes a further coincidence gate having inputs from the primary detector and the appropriate one of said secondary detectors, said further coincidence gate only delivering an output when marking potential occurs on both of its inputs, and means responsive to the occurrence of an output from a calling line's further coincidence gate for causing that line to be extended via a first switching stage.

References Cited in the file of this patent

UNITED STATES PATENTS

| | | |
|---|---|---|
| 2,603,713 | Ostline | July 15, 1952 |
| 2,694,753 | Den Hertog | Nov. 11, 1954 |
| 2,724,018 | Pouliart et al. | Nov. 15, 1955 |
| 2,808,459 | Barlow et al. | Oct. 1, 1957 |
| 2,816,168 | Morris et al. | Dec. 10, 1957 |
| 2,838,610 | Trousdale | June 10, 1958 |
| 2,872,524 | Aigrain | Feb. 3, 1959 |